US009313756B2

United States Patent
Kanamarlapudi et al.

(10) Patent No.: US 9,313,756 B2
(45) Date of Patent: Apr. 12, 2016

(54) APPARATUS AND METHODS FOR MANAGING HYPER FRAME NUMBER (HFN) DE-SYNCHRONIZATION IN RADIO LINK CONTROL (RLC) UNACKNOWLEDGED MODE (UM)

(71) Applicant: QUALCOMM Incorporated, San Diego, CA (US)

(72) Inventors: Sitaramanjaneyulu Kanamarlapudi, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 14/024,156

(22) Filed: Sep. 11, 2013

(65) Prior Publication Data

US 2014/0098797 A1    Apr. 10, 2014

Related U.S. Application Data

(60) Provisional application No. 61/712,120, filed on Oct. 10, 2012.

(51) Int. Cl.
*H04W 56/00* (2009.01)
*H04L 1/18* (2006.01)

(52) U.S. Cl.
CPC ........... *H04W 56/001* (2013.01); *H04L 1/1867* (2013.01); *H04L 1/1896* (2013.01); *H04W 56/002* (2013.01)

(58) Field of Classification Search
None
See application file for complete search history.

(56) References Cited

U.S. PATENT DOCUMENTS

| 8,335,189 | B2 | 12/2012 | Wang et al. | |
|---|---|---|---|---|
| 8,416,678 | B2 | 4/2013 | Yi et al. | |
| 2003/0147370 | A1 | 8/2003 | Wu | |
| 2006/0050679 | A1* | 3/2006 | Jiang | 370/350 |
| 2009/0168751 | A1* | 7/2009 | Sharma et al. | 370/350 |
| 2009/0186624 | A1* | 7/2009 | Cave et al. | 455/450 |
| 2009/0220079 | A1* | 9/2009 | Harada et al. | 380/252 |

FOREIGN PATENT DOCUMENTS

EP    2075942 A2    7/2009

OTHER PUBLICATIONS

May 2004, 3GPP TSG RAN WG3 Meeting #42 R2-041098, Usage of UM RLC for HSDPA and Avoidance of the Loss of HFN Synchronisaton, Siemens.

(Continued)

*Primary Examiner* — Edan Orgad
*Assistant Examiner* — Saumit Shah
(74) *Attorney, Agent, or Firm* — Arent Fox LLP

(57) ABSTRACT

Apparatus and methods of data communication between a transmitter and a receiver in a radio link control (RLC) unacknowledged mode (UM) include determining, by the transmitter, a hyper frame number (HFN) de-synchronization condition, wherein the HFN de-synchronization condition is FALSE when at least one protocol data unit (PDU) out of a plurality of successive PDUs is successfully transmitted by the transmitter to the receiver, and wherein the HFN de-synchronization condition is TRUE when all of the plurality of successive PDUs are lost, and adjusting, by the transmitter, a transmitter HFN of the transmitter when the HFN de-synchronization condition is TRUE, wherein the adjusted transmitter HFN is used for new PDUs to be transmitted.

18 Claims, 7 Drawing Sheets

(56) References Cited

OTHER PUBLICATIONS

Oct. 2004, 3GPP TSG RAN WG2 Meeting #44 R2-041940, On-line recovery of HFN synchronization due to RLC UM SN problem, ASUSTek.
Feb. 2005, 3GPP TSG RAN WG2 #46 Tdoc R2-050318, Summary of HFN de-synchronization problem off-line email discussion, Rapporteur (ASUSTek).
Oct. 2012, 3GPP TSG RAN WG3 Meeting #77 R3-122295, Network detection of HFN de-sync problem, Ericsson.
Nov. 2012, 3GPP TSG-RAN2 Meeting #80 R2-125230, Introduction of further Multiflow agreements in TS 25.322, Nokia Siemens Networks.
International Search Report and Written Opinion—PCT/US2013/059429—ISA/EPO—Dec. 10, 2013.
Jiang., S.S., et al., "Automatic Recovery of Ciphering Parameter Synchronization", IEICE Transactions on Communications, Communications Society, Tokyo, JP, vol. E88-B, No. 10, Oct. 1, 2005, pp. 4008-4012, XP001234397, ISSN: 0916-8516, DOI: 10.1093/IETCOMM/E88-B.10.4008 p. 4008, left-hand column, paragraph 1-right-hand column, paragraph 1 p. 4009, left-hand column, paragraph 2.1 p. 410, right-hand column, paragraph 3.1.

\* cited by examiner

APPARATUS AND METHODS FOR MANAGING HYPER FRAME NUMBER (HFN) DE-SYNCHRONIZATION IN RADIO LINK CONTROL (RLC) UNACKNOWLEDGED MODE (UM)

CLAIM OF PRIORITY UNDER 35 U.S.C. §119

The present application for patent claims priority to U.S. Provisional Application No. 61/712,120 entitled "METHOD FOR DETECTING AND CORRECTING HYPER FRAME NUMBER (HFN) DE-SYNCHRONIZATION IN RADIO LINK CONTROL (RLC) UNACKNOWLEDGED MODE (UM) ON HIGH SPEED PACKET ACCESS (HSPA) CHANNELS" filed Oct. 10, 2012, and assigned to the assignee hereof and hereby expressly incorporated by reference herein.

BACKGROUND

1. Field

Aspects of the present disclosure relate generally to wireless communication systems, and more particularly, to managing hyper frame number (HFN) de-synchronization in radio link control (RLC) unacknowledged mode (UM).

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In W-CDMA, RLC unacknowledged mode (UM) is a radio link protocol in which a success or failure of the received protocol data units (PDUs) are not acknowledged. RLC UM may be used for real-time or near-real-time applications as well as delay-sensitive applications. In RLC UM, ciphering and deciphering are performed on transmitted packets by utilizing a time-varying parameter value or count referred to as COUNT-C, which is a combination of a short sequence number (SN) and a long SN. The short SN is a 7-bit RLC SN that is part of the RLC UM protocol data unit (PDU) header. The long SN is a 25-bit RLC UM HFN that is incremented at each RLC SN cycle. Accordingly, upon transmitting every 127 consecutive RLC UM PDUs, an RLC SN cycle at the transmitting RLC UM entity is completed, the RLC SN at the transmitting RLC UM entity wraps around, and the HFN at the transmitting RLC UM entity is incremented. Meanwhile, if the receiving RLC UM entity misses more than 127 consecutive PDUs, because the receiving RLC UM entity is not aware of the missed PDUs, the HFN at the receiving RLC UM entity is not incremented, resulting in a de-synchronization between the HFNs at the transmitting and receiving RLC UM entities. Thereafter, if further RLC UM PDUs are transmitted and received correctly, due to the de-synchronization between the HFNs at the transmitting and receiving RLC UM entities, the data in the received RLC UM PDUs will be erroneously deciphered at the receiving RLC UM entity, and since the transmitting and receiving RLC UM entities will not be able to detect such error, the corrupted PDUs will just be forwarded to higher layers. Accordingly, in RLC UM, HFN de-synchronization can result in incorrect service data unit (SDU) generation or garbled voice in, e.g., voice over HSPA applications.

As the demand for mobile broadband access continues to increase, research and development continue to advance the UMTS technologies not only to meet the growing demand for mobile broadband access, but to advance and enhance the user experience with mobile communications. Thus, in this case, improved apparatus and methods are desired for managing HFN de-synchronization in RLC UM.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate generally to wireless communication systems, and more particularly, to apparatus and method for managing HFN de-synchronization in RLC UM.

In one aspect, a method of data communication between a transmitter and a receiver in an RLC UM is provided that includes determining, by the transmitter, an HFN de-synchronization condition, wherein the HFN de-synchronization condition is FALSE when at least one PDU out of a plurality of successive PDUs is successfully transmitted by the transmitter to the receiver, and wherein the HFN de-synchronization condition is TRUE when all of the plurality of successive PDUs are lost, and adjusting, by the transmitter, a transmitter HFN of the transmitter when the HFN de-synchronization condition is TRUE, wherein the adjusted transmitter HFN is used for new PDUs to be transmitted.

In one aspect, a computer program product for data communication between a transmitter and a receiver in an RLC UM is provided that includes a computer-readable medium, including code for determining, by the transmitter, an HFN de-synchronization condition, wherein the HEN de-synchronization condition is FALSE when at least one PDU out of a plurality of successive PDUs is successfully transmitted by the transmitter to the receiver, and wherein the HFN de-synchronization condition is TRUE when all of the plurality of successive PDUs are lost, and code for adjusting, by the transmitter, a transmitter HFN of the transmitter when the HFN de-synchronization condition is TRUE, wherein the adjusted transmitter HFN is used for new PDUs to be transmitted.

In one aspect, an apparatus for data communication between a transmitter and a receiver in an RLC UM is provided that includes means for determining, by the transmitter, an HFN de-synchronization condition, wherein the HFN de-synchronization condition is FALSE when at least one PDU out of a plurality of successive PDUs is successfully transmitted by the transmitter to the receiver, and wherein the HFN de-synchronization condition is TRUE when all of the plurality of successive PDUs are lost, and means for adjusting, by the transmitter, a transmitter HFN of the transmitter when the HFN de-synchronization condition is TRUE, wherein the adjusted transmitter HFN is used for new PDUs to be transmitted.

In one aspect, an apparatus for data communication between a transmitter and a receiver in an RLC UM is provided that includes at least one processor, and a memory coupled to the at least one processor, wherein the at least one processor is configured to determine, by the transmitter, an HFN de-synchronization condition, wherein the HFN de-synchronization condition is FALSE when at least one PDU out of a plurality of successive PDUs is successfully transmitted by the transmitter to the receiver, and wherein the HFN de-synchronization condition is TRUE when all of the plurality of successive PDUs are lost, and adjust, by the transmitter, a transmitter HFN of the transmitter when the HFN de-synchronization condition is TRUE, wherein the adjusted transmitter HFN is used for new PDUs to be transmitted.

These and other aspects of the disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

According to some aspects of the present disclosure, methods and apparatus are provided that detect and correct HFN de-synchronization in RLC UM. A transmitter that is communicating with a receiver in RLC UM may determine a condition of HFN de-synchronization, and if HFN de-synchronization is present, the transmitter may update or adjust a transmitter HFN to ensure that ciphering parameters are synchronized with the receiver. Accordingly, with HFN de-synchronization detection and enhanced HFN updating and synchronization in RLC UM, the transmitter can ensure that the transmitter HFN is the same as the receiver HFN so that correct SDUs can be deciphered out of received RLC UM PDUs at the receiver. In an aspect, this may result in a reduction of dropped calls due to wrong SDUs (internet protocol (IP) frames) during packet calls, and may also result in avoiding garbled voice during circuit switched (CS) calls when RLC UM entity is used over HSPA channels or voice over IP (VoIP) is used over HSPA channels. While the present description is presented primarily with reference to the HSPA radio technology, the description may also be applied to other radio technologies (e.g., long term evolution (LTE)) when those other technologies are in RLC UM.

Figure 1:
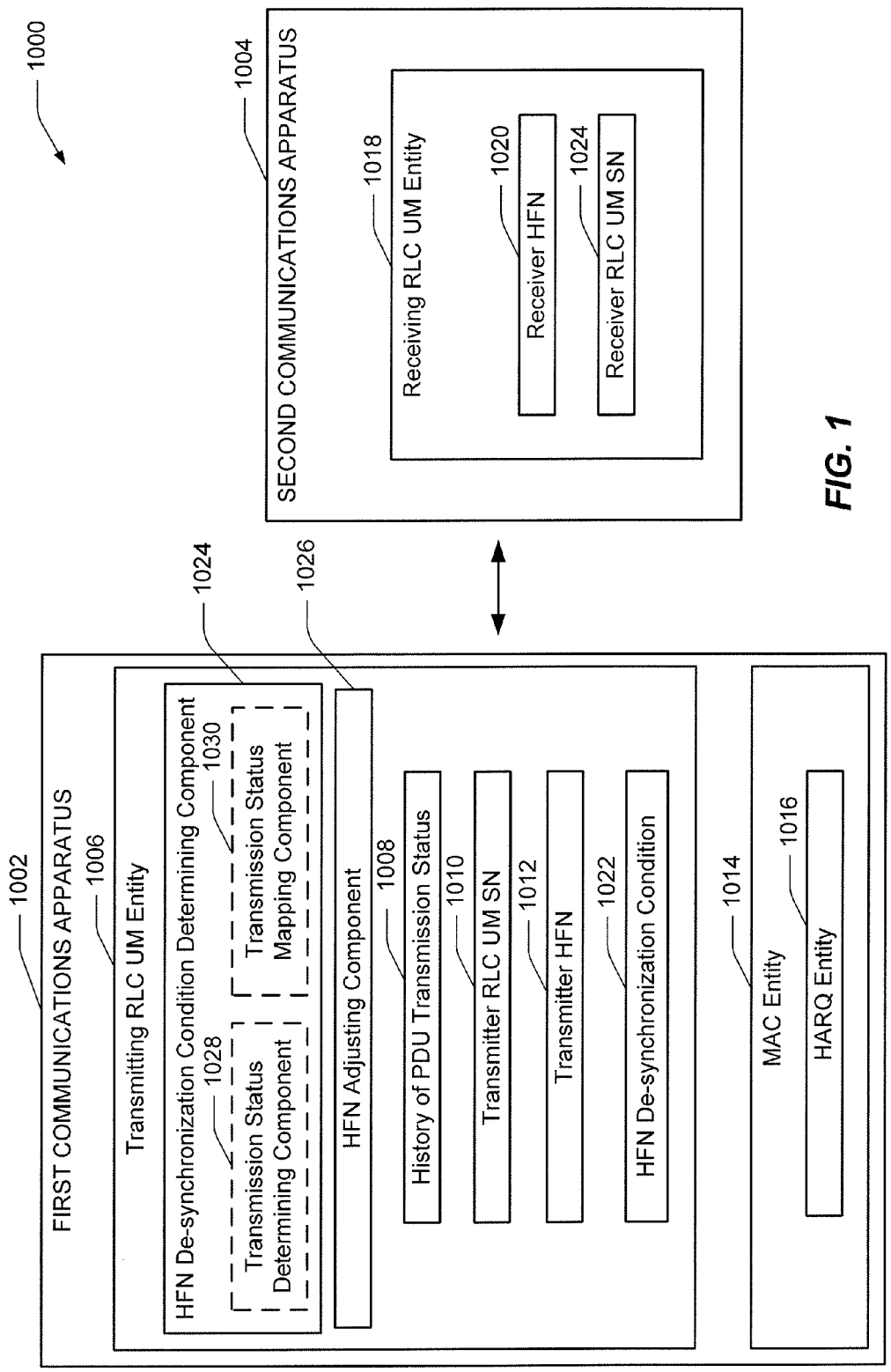
FIG. 1 is a schematic block diagram of one aspect of a system for managing HFN de-synchronization in RLC UM.

Referring to FIG. 1, in one aspect, system 1000 includes first communications apparatus 1002 that is communicating with second communications apparatus 1004. First communications apparatus 1002 and second communications apparatus 1004 are both operating in RLC UM, and respectively include transmitting RLC UM entity 1006 and receiving RLC UM entity 1018. According to operation in RLC UM, transmitting RLC UM entity 1006 transmits packets to receiving RLC UM entity 1018 and performs ciphering on the transmitted packets by utilizing transmitter RLC UM SN 1010 and transmitter HFN 1012. Correspondingly, according to operation in RLC UM, receiving RLC UM entity 1018 deciphers the received packets by utilizing receiver RLC UM SN 1024 and receiver HFN 1020. Accordingly, for successful deciphering of the received packets at receiving RLC UM entity 1018, while receiver RLC UM SN 1024 is determined based on transmitter RLC UM SN 1010 that is part of the RLC UM PDU header in the received packets, receiver HFN 1020 has to be synchronized with transmitter HFN 1012 without explicit information about transmitter HFN 1012.

In some aspects, at transmitting RLC UM entity 1006, upon transmitting a plurality of consecutive RLC UM PDUs corresponding to a total number of available RLC SN numbers, an RLC SN cycle is completed, transmitter RLC UM SN 1010 wraps around, and transmitter HFN 1012 is incremented. For example, in one aspect of an HSPA use case, the plurality of consecutive RLC UM PDUs corresponding to a total number of available RLC SN numbers is 127 consecutive RLC UM PDUs. Meanwhile, if receiving RLC UM 1018 entity misses more than the total number of available RLC SN numbers, e.g. more than 127 consecutive PDUs in the HSPA example, because receiving RLC UM entity 1018 is not aware of the missed consecutive PDUs, receiver HFN 1020 is not incremented, resulting in a de-synchronization between transmitter HFN 1012 and receiver HFN 1020. Thereafter, if further RLC UM PDUs are transmitted and received correctly, due to the de-synchronization between transmitter HFN 1012 and receiver HFN 1020, the data in the received RLC UM PDUs will be erroneously deciphered at receiving RLC UM entity 1018.

Although the communication between a sender and a receiver in RLC UM is an un-acknowledged operation, the 3GPP standard provides a mechanism of inter-layer communication within the transmitting RLC UM entity 1006 to learn about the success or failure of the transmitted packets. For example, in 25.321 MAC specifications, there is a provision to indicate the status of every PDU transmission by using primitives. A primitive has an order or data form and is used for exchanging transmission or reception information between an upper layer and a lower layer. Table 1 shows one non-limiting arrangement of primitives between a MAC layer and an RLC layer, although other arrangements may also be possible.

TABLE 1

An example of primitives between MAC and RLC

| Generic Name | Parameter | | | |
|---|---|---|---|---|
| | Request | Indication | Response | Confirm |
| MAC_DATA | Data, BO, UE-ID type indicator, RLC entity info | Data, No_TB, TD (only in TDD), Error indication | | |
| MAC_STATUS | | No_PDU, PDU_Size, TX status | BO, RLC entity info | |

As shown in Table 1, each logical channel and transport channel may exchange a MAC_DATA primitive and a MAC_STATUS primitive between a MAC sub-layer and an RLC sub-layer. As shown under the parameter header in Table 1, the primitives may provide a request, an indication, a response, a confirm, etc., between an upper layer and a lower layer. For example, a MAC_DATA_IND primitive may be used when data in a current buffer of a selected logical channel is required to be transmitted after the MAC transport format combination (TFC) selection process is performed. The logical channel may transmit PDUs to the transport channel using a MAC_DATA_REQ primitive according to a request. A MAC_STATUS_IND primitive may be used so that the transport channel informs each logical channel of a size and a number of PDUs transmittable in the logical channel.

According to some aspects, a transmit (TX) status primitive may be used by the MAC sub-layer to indicate the status of every PDU transmission to the RLC sub-layer. For example, TX status may be set to a value of "transmission unsuccessful" to indicate to the RLC that the transmission of an RLC PDU has failed in the previous transmission time interval (TTI). The TX status may also be set to a value of "transmission successful" to indicate to the RLC that a requested RLC PDU has been submitted for transmission by the physical layer. In some aspects, a transmission status of a PDU may be obtained from a protocol sub-layer different than the MAC sub-layer.

Generally, in some aspects, ciphering may be performed in the RLC sub-layer when a radio bearer is using RLC UM. In these aspects, ciphering errors may be related to the ciphering sequence number COUNT-C that is a 32 bit ciphering parameter. There is one COUNT-C value per up-link radio bearer and one COUNT-C value per downlink radio bearer using RLC UM. Table 2 shows a COUNT-C configuration in RLC UM.

TABLE 2

COUNT-C configuration in RLC UM

| HFN (25 bits) | RLC UM SN (7 bits) |
|---|---|

As shown in Table 2, COUNT-C in RLC UM is composed of two parts: a "short" sequence number and a "long" sequence number. The "short" sequence number forms the least significant bits of COUNT-C and is the 7-bit RLC UM SN that is part of the RLC UM PDU header. The "long" sequence number forms the most significant bits of COUNT-C and is the 25-bit RLC UM HFN that is incremented at each RLC SN cycle. The HFN may be initialized by the parameter START, e.g., a wireless transmit/receive unit (WTRU) and the radio network controller (RNC) may initialize the most significant bits of the RLC UM HFN to START, and the remaining bits of the RLC UM HFN may be initialized to zero. The HFN may not be explicitly transmitted with the packet.

Additionally, in an aspect, transmitting RLC UM entity 1002 further includes MAC entity 1014 that performs the functions of the MAC sub-layer. For every TTI, the MAC entity 1014 may request the plurality of PDUs to be transmitted from each logical channel, based on various factors (such as buffer occupancy, priority, available power, available grant, etc.) on the current hybrid automatic repeat request (HARQ) that is received by HARQ entity 1016. MAC entity 1014 may have the knowledge of the transmission status of HARQ entity 1016 based on the peer feedback (ACK/NAK) received by HARQ entity 1016. In some aspects, transmitting RLC UM entity 1006 may obtain the successful/unsuccessful transmission status of each PDU from MAC entity 1014 based on the transmission status of HARQ entity 1016. Accordingly, the transmitting RLC UM entity 1006 may store a history of PDU transmission status 1008 and may include HFN de-synchronization condition determining component 1024 that sets an HFN de-synchronization condition 1022 to be TRUE whenever the history of PDU transmission status 1008 indicates that a plurality of consecutive PDUs are lost, e.g., 128 consecutive PDUs are lost. The HFN de-synchronization condition 1022 may be set to FALSE whenever the history of PDU transmission status 1008 indicates that at least one PDU out of such plurality of PDUs is successfully transmitted, e.g., at least one PDU out of the last 128 PDUs is successfully transmitted. In some aspects, for example, HFN de-synchronization condition determining component 1024 may include transmission status determining component 1028 that determines the successful/unsuccessful transmission status of each PDU based on the transmission status of HARQ entity 1016.

In some aspects, transmitting RLC UM entity 1006 and/or HFN de-synchronization condition determining component 1024 may determine the value of HFN de-synchronization that resulted in a TRUE HFN de-synchronization condition 1022. To determine the value of HFN de-synchronization, an inter-layer communication may be used between MAC entity 1014 and transmitting RLC UM entity 1006. For example, MAC entity 1014 may provide the HARQ operation result for each HARQ transmission and may also provide "fail/success" feedback to transmitter RLC UM entity 1006 via an inter-layer communication interface within first communications apparatus 1002. Transmitting RLC UM entity 1006 may then keep track of the mapping of each HARQ fail/success with a corresponding transmitter RLC UM SN 1010. For example, in one aspect, HFN de-synchronization condition determining component 1024 may include transmission status mapping component 1030 that keeps track of the mapping of each HARQ fail/success with a corresponding transmitter RLC UM SN 1010. According to one example, transmitting RLC UM entity 1006, HFN de-synchronization condition determining component 1024, and/or transmission status mapping component 1030 may maintain an array of bit maps that records the fail/success related to at least the most recent 128 RLC UM PDU SNs, based on each MAC HARQ (re) transmission result (e.g., fail/success). In some aspects, transmitting RLC UM entity 1006, HFN de-synchronization condition determining component 1024, and/or transmission status mapping component 1030 may keep track of this mapping regardless of whether the RLC PDU size is configured to be "fixed size" or "flexible size". In these aspects, the PDU mapping between the two layers (e.g., MAC and RLC) may be done for both fixed and flexible RLC PDU sizes, subject to RLC PDU size configuration. In some aspects, where the mapping between the logical channel and the physical channels (e.g., the over the air radio channels) may be configured by the network, transmitter RLC UM entity 1006, HFN de-synchronization condition determining component 1024, and/or transmission status mapping component 1030 may additionally or alternatively keep track of the PDU mapping regardless of how the logical channels are multiplexed for over-the-air transmission.

In some aspects, first communications apparatus 1002 may be a UE or a mobile device that transmits uplink packets to second communications apparatus 1004, which may be a network entity such as a base station or a Node B. In these aspects, as the MAC and RLC are co-located in the mobile device, the inter-layer communication/signaling can be done through the implementation of primitives such as the TX status primitive as described herein.

In some aspects, first communications apparatus 1002 may be a network entity that transmits downlink packets to second communications apparatus 1004 which may be a UE or a mobile device. In these aspects, the inter-layer communication between the MAC and RLC layers may be via an interface or signaling between a Node-B (where MAC entity 1014 and HARQ entity 1016 are located) and the RNC (where the transmitting RLC UM entity 1002 is located). This interface or signaling can be an enhancement of the existing Iu interface (e.g., the external interface that connects the RNC to the core network). This interface or signaling may provide the MAC/HARQ "fail/success" feedback from the Node-B to the RNC, so that the transmitting RLC UM entity 1006 in RNC can determine the HFN de-synchronization condition 1022 as described herein.

In some aspects, when HFN de-synchronization condition 1022 is determined to be TRUE, transmitter HFN 1012 may be adjusted, for example, decremented, by the transmitting RLC UM entity 1006 and/or HFN adjusting component 1026, to ensure that transmitter HFN 1012 is synchronized with receiver HFN 1020, and that transmitting RLC UM entity 1006 and receiving RLC UM entity 1018 are using the same HFN in COUNT-C for ciphering/deciphering.

The following is one example showing how the transmitter HFN 1012 can be adjusted by the transmitting RLC UM entity 1006 and/or HFN adjusting component 1026. Assume that the transmitter HFN 1012 and the receiver HFN 1020 are both equal to 1, and transmitting RLC UM entity 1006 and receiving RLC UM entity 1018 successfully exchange RLC PDU SN 0 to 25. Also assume that the transmitting RLC UM entity 1006 follows by transmitting RLC UM PDU SN 26 to 127 using HFN 1, at which time the transmitter RLC UM SN 1010 rolls over to 0, and assume further that RLC UM PDU SN 26 to 127 fail transmission (102 failed PDUs), e.g., a negative acknowledgement (NACK) is received by HARQ entity 1016 for these transmissions. This NACK information can be extracted based on HARQ ACK/NACK status at HARQ entity 1016, and can be transmitted from MAC entity 1014 to transmitting RLC UM entity 1006. When transmitter RLC UM SN 1010 re-starts at 0 (or rolls over), transmitter HFN 1012 is incremented to 2. Now assume that with this re-started RLC UM SN 1010, another RLC UM PDU SN 0 to 25 are transmitted using HFN 2 but fail transmission (26 failed PDUs). Accordingly, a total of 128 successive PDUs have failed transmission. In this situation, in the absence of the detection of HFN de-synchronization, the transmitting RLC UM entity 1006 uses HFN 2 while the receiving RLC UM entity 1018 uses HFN 1, resulting in HFN de-synchronization and leading to voice garbling for voice over HSPA applications. However, if the HFN de-synchronization is detected as TRUE based on the indication that 128 successive PDUs have failed transmission, transmitter HFN 1012 may be adjusted (e.g., decremented) and HFN 1 may be used for the new PDUs to be transmitted. Meanwhile, at the receiving RLC UM entity 1018, the receiver HFN 1020 remains equal to 1 because none of the last 128 RLC UM PDUs were received, and receiver RLC UM SN 1024 did not roll over. Consequently, both the transmitter and the receiver are using the same HFN 1, and the COUNT-C parameter is the same ensuring synchronization of the ciphering/deciphering parameters.

In some aspect, a size of the plurality of consecutive PDUs used for determining HFN de-synchronization condition 1022 (e.g., the number of PDUs within the plurality of PDUs) may be equal to or more than one full RLC SN cycle. In one aspect, for example, the size of the plurality of consecutive PDUs used for determining HFN de-synchronization condition 1022 may be a multiple of one full RLC SN cycle. In this aspect, transmitter HFN 1012 may be adjusted according to the multiple of one full RLC SN cycle. For example, if the multiple of one full RLC SN cycle is 3 RLC SN full cycles, then, upon a determination of a TRUE HFN de-synchronization condition 1022, transmitter HFN 1012 may be subtracted by 3 at transmitting RLC UM entity 1006 to re-sync HFN. According to one example, the length of one full RLC SN cycle is 128.

Figure 2:
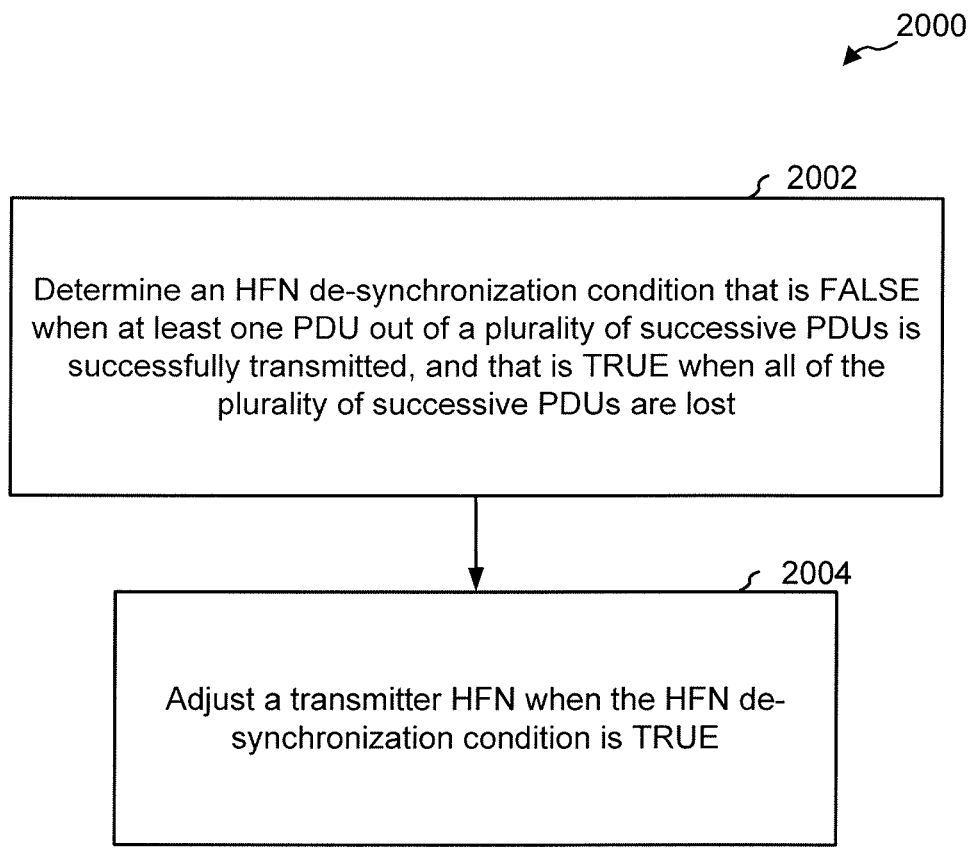
FIG. 2 is a flowchart of one aspect of a method of the system of FIG. 1.

Referring to FIG. 2, in one aspect, a method 2000 for managing HFN de-synchronization in RLC UM is illustrated. According to one or more aspects of method 2000, a transmitter may detect HFN de-synchronization and take corrective action even when the transmitter is operating in RLC UM. For explanatory purposes, method 2000 will be discussed with reference to the above described FIG. 1. It should be understood that in other implementations, other systems and/or communications apparatus, UEs, Node Bs, or other apparatus comprising different components than those illustrated in FIG. 1 may be used in implementing method 2000 of FIG. 2.

At block 2002, method 2000 includes determining an HFN de-synchronization condition that is FALSE when at least one PDU out of a plurality of successive PDUs is successfully transmitted, and that is TRUE when all of the plurality of successive PDUs are lost. For example, in an aspect, first communications apparatus 1002 and/or HFN de-synchronization condition determining component 1024 may determine HFN de-synchronization condition 1022 based on the history of PDU transmission status 1008 obtained from HARQ entity 1016. HFN de-synchronization condition 1022 may be set to TRUE when all of the plurality of successive PDUs (for example, 128 successive PDUs) are lost, and may be set to FALSE when at least one PDU out of a plurality of successive PDUs is successfully transmitted. According to some aspects, a TX status primitive may be used by the MAC sub-layer to indicate the status of every PDU transmission to the RLC sub-layer.

For example, in an aspect of execution of block 2002, in every TTI, a MAC entity may request the plurality of PDUs to be transmitted from each logical channel based on various factors (e.g., buffer occupancy, priority, available power, available grant, etc.) on the current HARQ. In some aspects, the MAC entity may also know a HARQ entity transmission status based on peer feedback (e.g., ACK/NAK). In some aspects, for example, the RLC entity may get the successful/unsuccessful transmission status of each PDU based on the HARQ status from the MAC entity. Accordingly, in these aspects, HFN de-synchronization may be set to TRUE when a loss of a plurality of consecutive PDUs (e.g., 128 consecutive PDUs) is identified by the transmitter. Also, HFN de-synchronization may be set to FALSE when at least one PDU out of the last plurality of consecutive PDUs (e.g., the last 128 consecutive PDUs) is identified to be successfully transmitted.

In some aspects, an RLC UM transmitter may use the inter-layer communication between two protocol layers (e.g., MAC sub-layer and RLC sub-layer), so that the MAC sub-layer can provide to the RLC sub-layer a HARQ operation result of a HARQ transmission. As such, in these aspects, within the transmitter itself, the MAC sub-layer provides the fail/success feedback to the RLC UM entity via an inter-layer communication interface. In some aspects, the RLC sub-layer keeps track of the mapping of a HARQ fail/success with a corresponding RLC UM SN. In one aspect, for example, the RLC UM entity may maintain an array of bit map that records the fail/success of, at least, a number of the most recent RLC UM PDU sequence numbers (e.g., at least the 128 most recent RLC UM PDU sequence numbers), based on each MAC HARQ transmission or retransmission result (e.g., fail or success). In some aspects, the RLC sub-layer may keep track of the mapping of the HARQ fail/success with the corresponding RLC UM SN, regardless of whether an RLC PDU size is configured to be flexible or fixed. In some aspect, alternatively or additionally, the RLC sub-layer may keep track of the HARQ fail/success mapping regardless of how the logical channels are multiplexed for transmission over the air.

In some aspects, when the transmitter is transmitting a downlink communication (e.g., transmitting from a network to a mobile device), a network inter-layer communication may be performed by an interface or signaling from, e.g., a Node-B where MAC/HARQ function is located, to, e.g., the RNC (radio network controller) where an RLC UM transmitter is located. In these aspects, such interface may, for example, be a part of an existing Iu interface with enhancement, and may provide the MAC/HARQ fail/success feedback from the Node-B to the RNC, so that the RLC UM entity in the RNC can determine the HFN de-synchronization condition.

In some aspects, when the transmitter is transmitting an uplink communication (e.g., when the transmitter is a mobile device), since the MAC and RLC are co-located in the transmitter (e.g., mobile device), an inter-layer communication/signaling may be performed for the bit-map tracking as described herein.

At block 2004, method 2000 includes adjusting a transmitter HFN when the HFN de-synchronization condition is TRUE. As such, the RLC UM transmitter may update a transmitter HFN to ensure ciphering parameter synchronization, when the HFN de-synchronization condition is TRUE. For example, in an aspect, HFN adjusting component 1026 may adjust transmitter HFN 1012 when HFN de-synchronization condition is TRUE.

For example, in some aspects of an execution of block 2004, when an HFN de-synchronization is detected, a transmitter HFN may be decremented by the RLC UM transmitter to ensure that both peer entities are using the same HFN in COUNT-C for ciphering/deciphering. The following is one non-limiting example of how the HFN can be adjusted by the RLC UM transmitter. In this example, in step a, a transmitter and a receiver exchange RLC UM PDU SN 0 to 25 with HFN 1. Then, in step b, RLC UM PDU SN 26 to SN 127 are transmitted using HFN 1. At this time the SN is to be rolled over to 0. In step c, on SN rollover, HFN is incremented to 2, and RLC UM PDU SN 0 to SN 25 are transmitted using HFN 2 (e.g., SN re-starts or rolls over from 0, and HFN is increased by 1, according to the standard protocol). In step d of this example, all the PDUs in steps b and c (128 PDUs consecutively) are failed transmissions (e.g., the receiver has NAKed all those transitions via HARQ operation), and "HFN De-synchronization" is detected. This NAK information can be extracted based on HARQ ACK/NAK status from MAC to RLC. Without any HFN adjustment, at this stage of this example, the transmitter is using HFN 2 while the receiver is using HFN 1, which results in HFN de-synchronization and can lead to voice garbling issues for voice over HSPA applications. However, by detecting the "HFN De-synchronization" as TRUE, in step e, HFN is decremented at the transmitter side, and HFN 1 is used for the new PDUs to be transmitted. Meanwhile, at the receiver side, HFN is kept as 1 because none of the last 128 RLC UM PDUs were received and RLC UM SN did not roll over. As a result, both the transmitter and the receiver are using the same HFN, and COUNT-C parameter is the same, ensuring synchronization of the cipher/decipher parameters. The error detection based on 128 consecutive PDUs is just one example without loss of generality, and the error detection may be extended for any multiple of 128 consecutive PDUs as the detection cycle, and the HFN can be adjusted accordingly at the RLC UM transmitter to re-synchronize HFN.

Thus, the present apparatus and methods determine a condition of HFN de-synchronization at a transmitter RLC UM entity, and when such condition is determined to be TRUE, the present apparatus and methods perform an HFN update at the transmitter.

Figure 3:
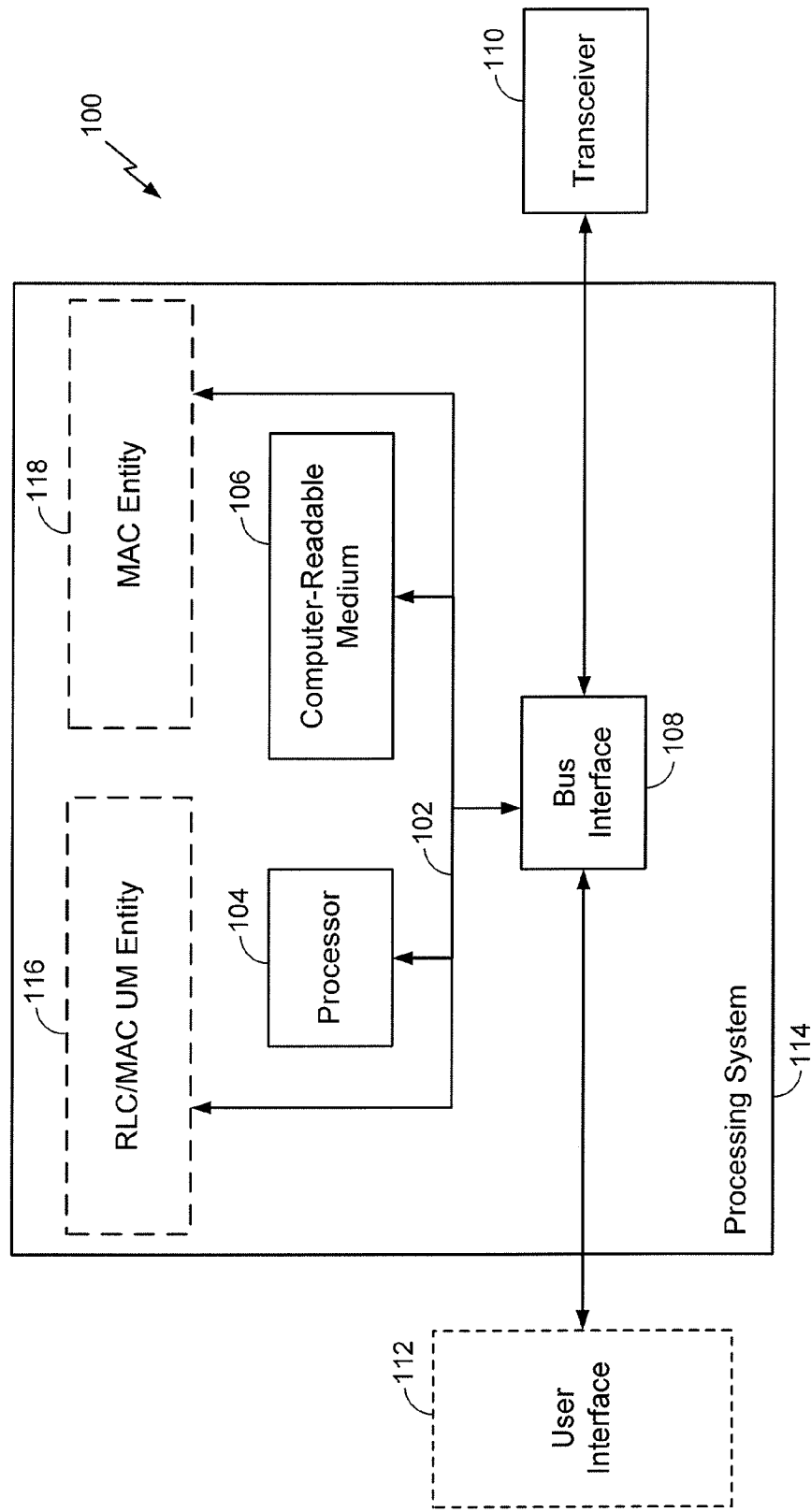
FIG. 3 is a block diagram illustrating an example of a hardware implementation for an apparatus of FIG. 1 employing a processing system.

FIG. 3 is a block diagram illustrating an example of a hardware implementation for an apparatus 100 employing a processing system 114 to operate, for example, first communications apparatus 1002, second communications apparatus 1004, transmitting RLC UM entity 1006, MAC entity 1014, receiving RLC UM entity 1018, and/or respective components thereof (see FIG. 1). For example, in one aspect, apparatus 100 may operate first communications apparatus 1002 and may include RLC/MAC UM entity 116 and MAC entity 118, which may be the same as or similar to transmitting RLC UM entity 1006 and MAC entity 1014, respectively. In another aspect, for example, apparatus 100 may operate second communications apparatus 1004 and may include RLC/MAC UM entity 116, which may be the same as or similar to receiving RLC UM entity 1018. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software. Alternatively or additionally, apparatus 100 may include RLC/MAC UM entity 116 and MAC entity 118 such that, when executed by the processor 104, RLC/MAC UM entity 116 and MAC entity 118 perform the various functions described infra for a respective one of first communications apparatus 1002, second communications apparatus 1004, transmitting RLC UM entity 1006, MAC entity 1014, or receiving RLC UM entity 1018 (see FIG. 1).

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
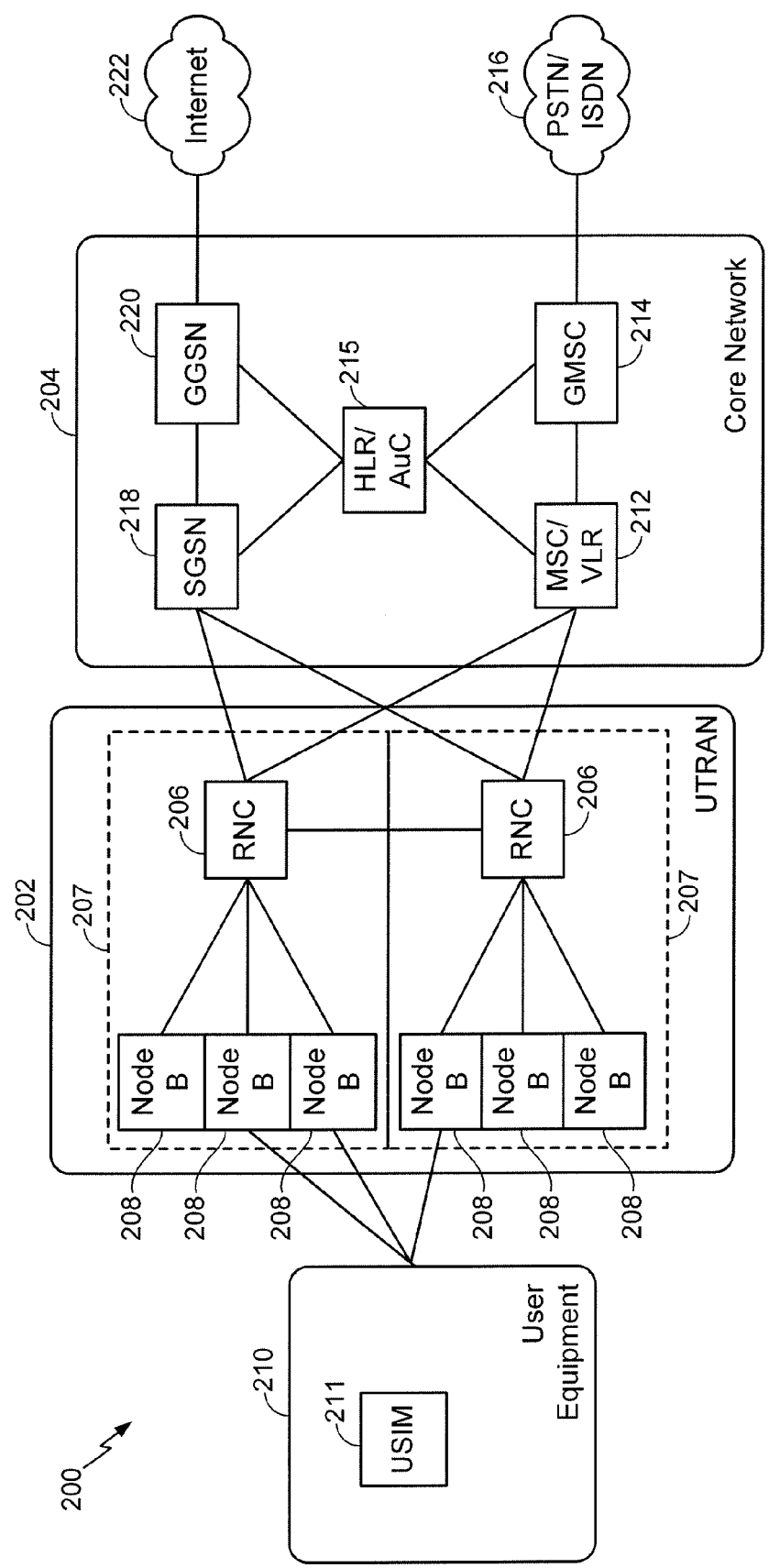
FIG. 4 is a block diagram conceptually illustrating an example of a telecommunications system including aspects of the system of FIG. 1.

The various concepts presented throughout this disclosure may be implemented across a broad variety of telecommunication systems, network architectures, and communication standards. Referring now to FIG. 4, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Any transmitting and receiving pair of devices, e.g., UE 210 and UTRAN 202, may respectively include or be similar to first communications apparatus 1002 and second communications apparatus 1004, and/or their respective components, e.g., transmitting RLC UM entity 1006, MAC entity 1014, receiving RLC UM entity 1018, apparatus 100, and/or any other components thereof (see FIGS. 1 and 3).

Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 5:
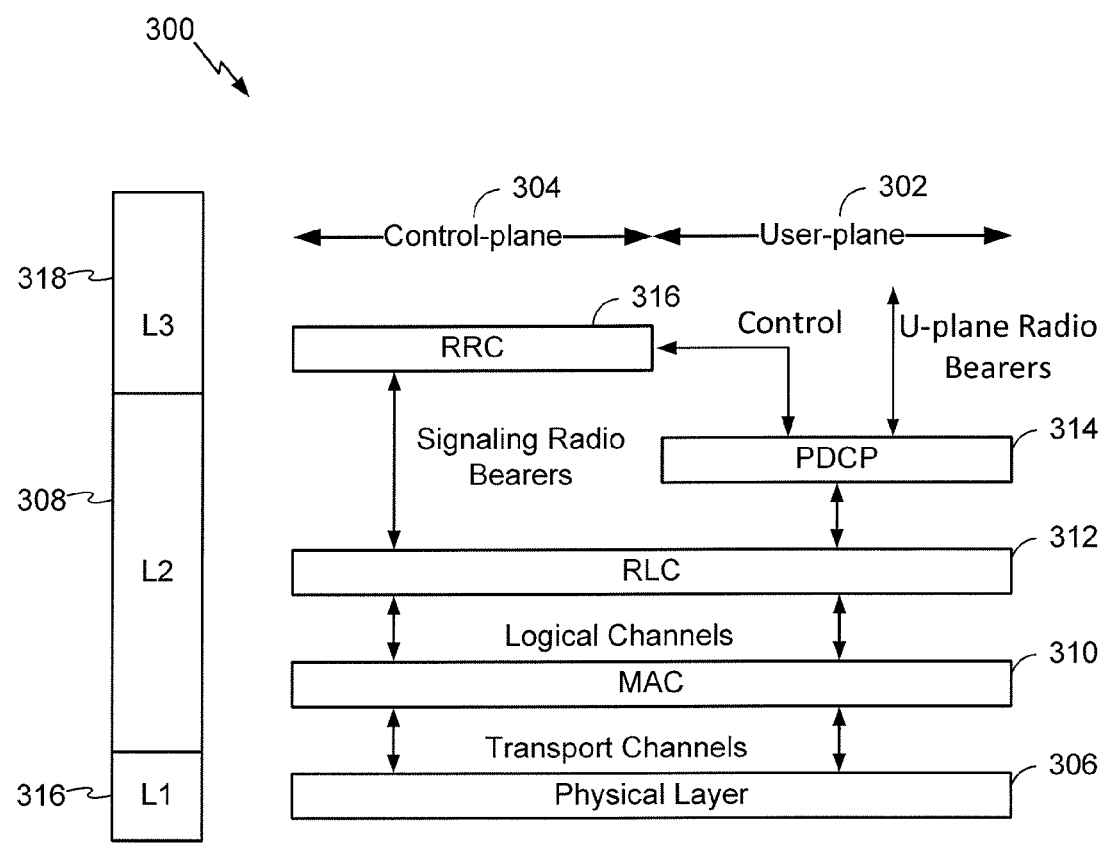
FIG. 5 is a conceptual diagram illustrating an example of a radio protocol architecture for the user and control planes in aspects of the system of FIG. 1.

Turning to FIG. 5, the access stratum (AS) is shown with three layers L1 316, L2 308, and L3 318, in an example radio protocol architecture 300 relating to the user plane 302 and the control plane 304 of a user equipment (UE) or a node B/base station. For example, architecture 300 may be included in first communications apparatus 1002, second communications apparatus 1004, or apparatus 100 (see FIGS. 1 and 3), or in UE 210 or Node B 208 (see FIG. 4).

Layer 1 316 is the lowest layer and implements various physical layer signal processing functions. Layer 1 316 will be referred to herein as the physical layer 306. The data link layer, called Layer 2 308, is above the physical layer 306 and is responsible for the link between the UE 210 and Node B 208 over the physical layer 306.

At Layer 3, the RRC layer 316 handles the control plane signaling between the UE 210 and the Node B 208. RRC layer 316 includes a number of functional entities for routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a media access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

The MAC sublayer 310 includes various MAC entities, including but not limited to a MAC-d entity and a MAC-hs/ehs entity. The Radio Network Controller (RNC) houses protocol layers from MAC-d and above. For the high speed channels, the MAC-hs/ehs layer is housed in the Node B.

From the UE side, The MAC-d entity is configured to control access to all the dedicated transport channels, to a MAC-c/sh/m entity, and to the MAC-hs/ehs entity. Further, from the UE side, the MAC-hs/ehs entity is configured to handle the HSDPA specific functions and control access to the HS-DSCH transport channel. Upper layers configure which of the two entities, MAC-hs or MAC-ehs, is to be applied to handle HS-DSCH functionality.

Figure 6:
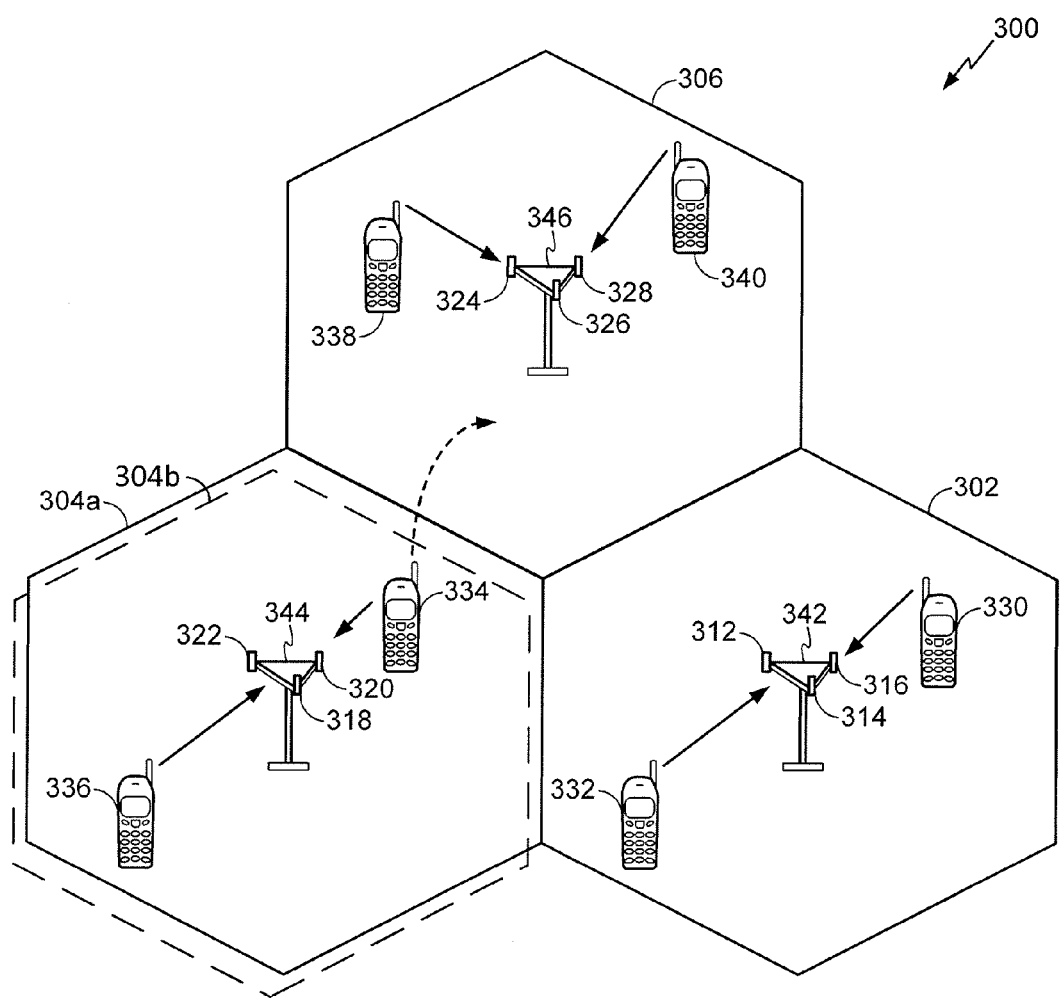
FIG. 6 is a conceptual diagram illustrating an example of an access network including aspects of the system of FIG. 1.

Referring to FIG. 6, an access network 300 in a UTRAN architecture is illustrated in which one or more of the wireless communication entities, e.g., UEs and/or base stations, may include, for example, first communications apparatus 1002, second communications apparatus 1004, UE 210, Node B 208, transmitting RLC UM entity 1006, MAC entity 1014, receiving RLC UM entity 1018, or apparatus 100 (see FIGS. 1, 3, and 4).

The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 4) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

Figure 7:
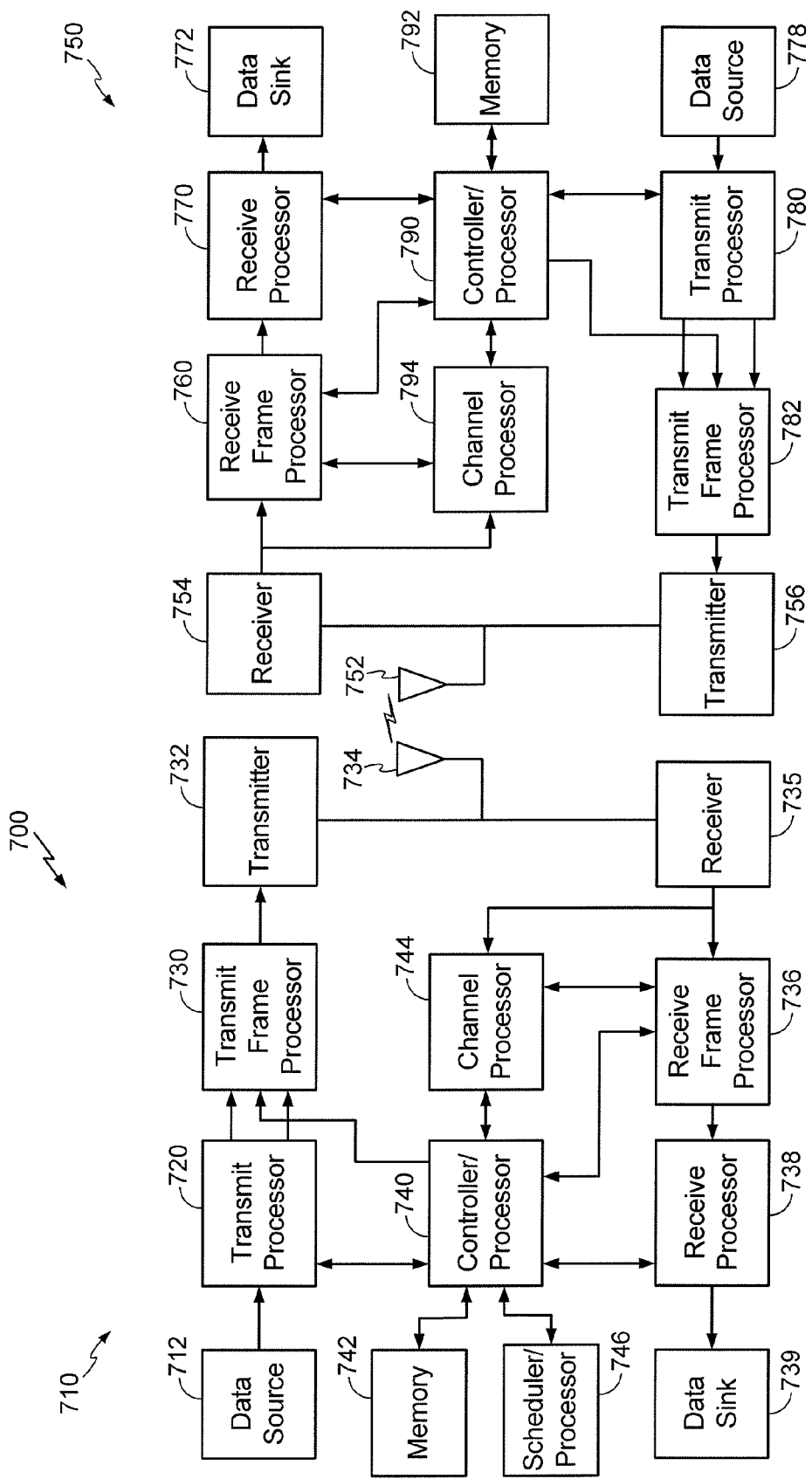
FIG. 7 is a block diagram conceptually illustrating an example of a Node B in communication with a UE in a telecommunications system including aspects of the system of FIG. 1.

FIG. 7 is a block diagram of a telecommunications system 700 comprising a Node B 710 in communication with a UE 750, where the Node B 710 and the UE 750 may include first communications apparatus 1002, second communications apparatus 1004, UE 210, Node B 208, transmitting RLC UM entity 1006, receiving RLC UM entity 1018, MAC entity 1014, or apparatus 100 (see FIGS. 1, 3, and 4).

In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 778 and control signals from the controller/processor 790 are provided to a transmit processor 780. The data source 778 may represent applications running in the UE 750 and various user interfaces (e.g., keyboard). Similar to the functionality described in connection with the downlink transmission by the Node B 710, the transmit processor 780 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 750, respectively. For example, the controller/processors 740 and 790 may provide various functions including timing, peripheral interfaces, voltage regulation, power management, and other control functions. The computer readable media of memories 742 and 792 may store data and software for the Node B 710 and the UE 750, respectively. A scheduler/processor 746 at the Node B 710 may be used to allocate resources to the UEs and schedule downlink and/or uplink transmissions for the UEs.

A high speed packet access (HSPA) air interface includes a series of enhancements to the 3G/W-CDMA air interface between the UE 750 and the Node B 710, facilitating greater throughput and reduced latency for users. Among other modifications over prior standards, HSPA utilizes hybrid automatic repeat request (HARM), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between Release-5 HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Release 5 HSDPA, at any instance a UE 210 has one serving cell: the strongest cell in the active set as according to the UE measurements of $E_c/I_0$. According to mobility procedures defined in Release 5 of 3GPP TS 25.331, the radio resource control (RRC) signaling messages for changing the HSPDA serving cell are transmitted from the current HSDPA serving cell (i.e., the source cell) and not the cell that the UE reports as being the stronger cell (i.e., the target cell).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of data communication between a transmitter and a receiver in a radio link control (RLC) unacknowledged mode (UM), comprising:
    determining, by the transmitter operating in the RLC UM, a hyper frame number (HFN) de-synchronization condition, wherein the HFN de-synchronization condition is FALSE when at least one protocol data unit (PDU) out of a plurality of successive PDUs is successfully transmitted by the transmitter to the receiver, wherein the HFN de-synchronization condition is TRUE when all of the plurality of successive PDUs are lost, and wherein a number of the plurality of successive PDUs is equal to a full cycle of RLC UM sequence numbers, a multiple of the full cycle of RLC UM sequence numbers, or a number greater than the full cycle of RLC UM sequence numbers; and
    adjusting, by the transmitter operating in the RLC UM, a transmitter HFN of the transmitter in response to the HFN de-synchronization condition is TRUE, wherein the adjusted transmitter HFN is used for new PDUs to be transmitted in the RLC UM.

2. The method of claim 1, wherein the determining comprises:
    determining, by an RLC sub-layer of the transmitter, a successful or unsuccessful transmission status of a PDU based on a transmission status of the PDU in a media access control (MAC) sub-layer; and
    mapping, by the RLC sub-layer, the successful or unsuccessful transmission status to the plurality of successive PDUs.

3. The method of claim 2, wherein the transmission status comprises a hybrid automatic repeat request (HARM), wherein the MAC sub-layer provides a transmit status primitive to the RLC sub-layer, wherein the transmit status primitive indicates a status of a PDU transmission.

4. The method of claim 2, wherein the data communication comprises an uplink communication from the transmitter to the receiver, wherein the MAC sub-layer and the RLC sub-layer are collocated at the transmitter, wherein the MAC sub-layer provides the HARQ to the RLC sub-layer via an inter-layer communication interface between the MAC sub-layer and the RLC sub-layer.

5. The method of claim 2, wherein the data communication comprises a downlink communication from the transmitter to the receiver, wherein the MAC sub-layer provides the HARQ to the RLC sub-layer via a network inter-layer communication between a first network entity and a second network entity, wherein the first network entity comprises the RLC sub-layer, and wherein the second network entity comprises the MAC sub-layer.

6. The method of claim 1, wherein each one of the transmitter or the receiver comprises a Node B, a user equipment, or a network entity.

7. The method of claim 1, wherein the adjusting the transmitter HFN comprises: adjusting the transmitter HFN to synchronize the transmitter HFN with a receiver HFN of the receiver, wherein ciphering and deciphering parameters of the transmitter and the receiver are synchronized when the transmitter and the receiver use a same HFN and a same RLC UM sequence number.

8. The method of claim 1, wherein the adjusting of the transmitter HFN comprises:
    decrementing the transmitter HFN.

9. A non-transitory computer-readable medium storing computer-executable code for data communication between a transmitter and a receiver in a radio link control (RLC) unacknowledged mode (UM), comprising:
    code for determining, by the transmitter operating in the RLC UM, a hyper frame number (HFN) de-synchronization condition, wherein the HFN de-synchronization condition is FALSE when at least one protocol data unit (PDU) out of a plurality of successive PDUs is successfully transmitted by the transmitter to the receiver, wherein the HFN de-synchronization condition is TRUE when all of the plurality of successive PDUs are lost, and wherein a number of the plurality of successive PDUs is equal to a full cycle of RLC UM sequence numbers, a multiple of the full cycle of RLC UM sequence numbers, or a number greater than the full cycle of RLC UM sequence numbers; and
    code for adjusting, by the transmitter operating in the RLC UM, a transmitter HFN of the transmitter when the HFN de-synchronization condition is TRUE, wherein the adjusted transmitter HFN is used for new PDUs to be transmitted in the RLC UM.

10. An apparatus for data communication between a transmitter and a receiver in a radio link control (RLC) unacknowledged mode (UM), comprising:
    a memory coupled to the at least one processor storing executable instructions;
    and a processor in communication with the memory, wherein the processor is configured to execute the instructions to:

determine, by the transmitter operating in the RLC UM, a hyper frame number (HFN) de-synchronization condition, wherein the HFN de-synchronization condition is FALSE when at least one protocol data unit (PDU) out of a plurality of successive PDUs is successfully transmitted by the transmitter to the receiver, wherein the HFN de-synchronization condition is TRUE when all of the plurality of successive PDUs are lost, and wherein a number of the plurality of successive PDUs is equal to a full cycle of RLC UM sequence numbers, a multiple of the full cycle of RLC UM sequence numbers, or a number greater than the full cycle of RLC UM sequence numbers; and adjust, by the transmitter operating in the RLC UM, a transmitter HFN of the transmitter when the HFN de-synchronization condition is TRUE, wherein the adjusted transmitter HFN is used for new PDUs to be transmitted in the RLC UM.

11. An apparatus for data communication between a transmitter and a receiver in a radio link control (RLC) unacknowledged mode (UM), comprising:

means for determining, by the transmitter operating in the RLC UM, a hyper frame number (HFN) de-synchronization condition, wherein the HFN de-synchronization condition is FALSE when at least one protocol data unit (PDU) out of a plurality of successive PDUs is successfully transmitted by the transmitter to the receiver, wherein the HFN de-synchronization condition is TRUE when all of the plurality of successive PDUs are lost, and wherein a number of the plurality of successive PDUs is equal to a full cycle of RLC UM sequence numbers, a multiple of the full cycle of RLC UM sequence numbers, or a number greater than the full cycle of RLC UM sequence numbers; and means for adjusting, by the transmitter operating in the RLC UM, a transmitter HFN of the transmitter when the HFN de-synchronization condition is TRUE, wherein the adjusted transmitter HFN is used for new PDUs to be transmitted in the RLC UM.

12. The apparatus of claim 11, wherein the means for determining is further for:

determining, by an RLC sub-layer of the transmitter, a successful or unsuccessful transmission status of a PDU based on a transmission status of the PDU in a media access control (MAC) sub-layer; and mapping, by the RLC sub-layer, the successful or unsuccessful transmission status to the plurality of successive PDUs.

13. The apparatus of claim 12, wherein the transmission status comprises a hybrid automatic repeat request (HARQ), wherein the MAC sub-layer provides a transmit status primitive to the RLC sub-layer, wherein the transmit status primitive indicates a status of a PDU transmission.

14. The apparatus of claim 12, wherein the data communication comprises an uplink communication from the transmitter to the receiver, wherein the MAC sub-layer and the RLC sub-layer are collocated at the transmitter, wherein the MAC sub-layer provides the HARQ to the RLC sub-layer via an inter-layer communication interface between the MAC sub-layer and the RLC sub-layer.

15. The apparatus of claim 12, wherein the data communication comprises a downlink communication from the transmitter to the receiver, wherein the MAC sub-layer provides the HARQ to the RLC sub-layer via a network inter-layer communication between a first network entity and a second network entity, wherein the first network entity comprises the RLC sub-layer, and wherein the second network entity comprises the MAC sub-layer.

16. The apparatus of claim 11, wherein each one of the transmitter or the receiver comprises a Node B, a user equipment, or a network entity.

17. The apparatus of claim 11, wherein the means for adjusting adjusts the transmitter HFN to synchronize the transmitter HFN with a receiver HFN of the receiver, wherein ciphering and deciphering parameters of the transmitter and the receiver are synchronized when the transmitter and the receiver use a same HFN and a same' RLC UM sequence number.

18. The apparatus of claim 11, wherein the means for adjusting adjusts the transmitter HFN by decrementing the transmitter HFN.

* * * * *